(12) United States Patent
Rompage et al.

(10) Patent No.: US 10,065,694 B1
(45) Date of Patent: Sep. 4, 2018

(54) VEHICLE ASSEMBLY

(71) Applicant: Honda Motor Co., Ltd., Tokyo (JP)

(72) Inventors: Adam J. Rompage, Dublin, OH (US);
Edward W. Bach, Marysville, OH (US); Kevin D. Helton, Marysville, OH (US); Masahiro Ishikawa, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1 day.

(21) Appl. No.: 15/598,369

(22) Filed: May 18, 2017

(51) Int. Cl.
| | |
|---|---|
| *B62D 25/06* | (2006.01) |
| *B62D 65/02* | (2006.01) |
| *B62D 27/02* | (2006.01) |
| *B62D 27/06* | (2006.01) |
| *B62D 29/00* | (2006.01) |

(52) U.S. Cl.
CPC ............. *B62D 65/02* (2013.01); *B62D 25/06* (2013.01); *B62D 27/026* (2013.01); *B62D 27/065* (2013.01); *B62D 29/007* (2013.01); *B62D 29/008* (2013.01); *B60Y 2410/124* (2013.01)

(58) Field of Classification Search
CPC .... B62D 65/02; B62D 29/008; B62D 29/007; B62D 27/026
USPC .......................................................... 296/210
See application file for complete search history.

(56) References Cited

U.S. PATENT DOCUMENTS

| | | | |
|---|---|---|---|
| 4,957,326 A | 9/1990 | Chiba et al. | |
| 5,681,076 A * | 10/1997 | Yoshii | B62D 25/06 296/104 |
| 7,334,309 B2 * | 2/2008 | Huijer | B60R 13/0231 29/458 |
| 8,042,863 B2 * | 10/2011 | Nydam | B62D 33/08 296/104 |
| 8,196,999 B2 | 6/2012 | Disse et al. | |
| 8,424,961 B2 | 4/2013 | Carsley et al. | |
| 8,636,197 B1 | 1/2014 | Hill et al. | |
| 8,820,824 B1 | 9/2014 | Hinz et al. | |
| 8,973,809 B2 | 3/2015 | Hill et al. | |
| 9,114,836 B1 | 8/2015 | Hinz et al. | |
| 9,132,872 B2 * | 9/2015 | Doll | B62D 65/022 |

(Continued)

FOREIGN PATENT DOCUMENTS

| | | |
|---|---|---|
| DE | 102008005286 | 6/2009 |
| DE | 102009004479 | 7/2010 |
| DE | 10201031774 | 3/2011 |

(Continued)

*Primary Examiner* — Pinel E Romain
(74) *Attorney, Agent, or Firm* — Rankin, Hill & Clark LLP (57) ABSTRACT

A vehicle assembly includes a steel vehicle body with a vehicle body component defined by a pair of body members. The vehicle body component defines a body adhesive bonding zone. Front and rear roof rails span laterally between the body members. An aluminum vehicle roof component includes a roof panel having a peripheral flange structure which defines a roof adhesive bonding zone corresponding to the body adhesive bonding zone. Forward and rear support brackets extend laterally across the roof panel, a portion of each support bracket is located on the flange structure inwardly of the roof adhesive bonding zone. The support brackets are configured to provide a vertical spacing between the flange structure and the vehicle body. The vehicle roof component is bonded to the vehicle body via an adhesive applied to the body and roof adhesive bonding zones.

20 Claims, 12 Drawing Sheets

(56) References Cited

U.S. PATENT DOCUMENTS

2015/0344075 A1    12/2015  Seo et al.

FOREIGN PATENT DOCUMENTS

| DE | 102012009389 | 11/2013 |
| JP | 2011073569 | 4/2011 |
| JP | 2011105102 | 6/2011 |

* cited by examiner

VEHICLE ASSEMBLY

BACKGROUND

In the manufacture or assembly of a vehicle body, it is known to have an assembly line including a plurality of stations in which the vehicle body is assembled and forwarded as the assembly work proceeds. Typically, the major structural components of the vehicle body are formed of low carbon steel or steel-based alloy panels that are welded together in general welders (i.e., stations wherein primary welding operations are performed to connect the vehicle body components to create the body-in-white body).

The substitution of aluminum or aluminum-based alloy roof components for the low-carbon steel or steel alloy roof components most commonly used in motor vehicles is an attractive option for vehicle mass reduction. Often, however, the remainder of the vehicle body component continues to be fabricated of steel. Joining an aluminum roof component to a steel body component presents difficulties because the aluminum roof component cannot be set and joined in the existing general welder due to equipment and process constraints. Therefore, it is known for manufacturers to secure the aluminum roof component to the steel body component after the weld process in assembly. This process typically includes an adhesive bonding operation and fasteners can also be used to secure the aluminum roof component to the steel body. This approach, though appealing from a vehicle mass-reduction viewpoint, raises issues due to the significantly different coefficients of thermal expansion of aluminum and steel (about $22.5 \times 10^{-6}$ m/m K for aluminum and about $13 \times 10^{-6}$ m/m K for steel). The combination of the aluminum roof component attached to the steel body component may create compressive stresses in the aluminum roof component when the body component is subjected to elevated temperatures such as those required to cure or bake the paint applied to the steel body component and to cure the adhesive bonding the aluminum roof component to the steel body. These stresses may lead to unacceptable appearance features in the visible segment of the aluminum roof component, and if left unconstrained, the aluminum roof component would bow enough to break the adhesive bond between the aluminum roof component and the steel vehicle body.

One manner of ensuring proper adhesion of the aluminum roof component to the steel body component is to apply the adhesive after completing the electrocoating bath and painting processes. The aluminum roof component is positioned above the steel body component using temporary stand-off fixtures. The spacing created by these stand-off fixtures allows for e-coat and paint coverage. Because the stand-off fixtures do not strongly affix the aluminum roof component to the steel body component, deformation of the aluminum roof component in the ovens is avoided. The aluminum roof component is then removed from the stand-off fixtures, the stand-off fixtures are removed, the adhesive is applied to the aluminum roof component, and the aluminum roof component is positioned on the steel body component in the final installation configuration. Although this manufacturing process can prevent the deformation of the aluminum roof component, assembly time is increased as the stand-off fixtures must first be installed and removed. In addition, because the aluminum roof component is positioned much farther apart from the steel body, the flange of steel body component where the adhesive is applied is exposed to paint and may not provide a good bonding surface unless the flange is masked. However, applying and removing masking to the adhesive bonding surfaces further increases the assembly time and cost.

BRIEF DESCRIPTION

According to one aspect, a vehicle assembly comprises a vehicle body including a vehicle body component defined by a pair of laterally spaced body members for defining sides of a passenger compartment. The vehicle body component defines a body adhesive bonding zone. A front roof rail and a rear roof rail span laterally between the body members. The vehicle body component together with the front and rear roof rails support a vehicle roof component over the passenger compartment. The vehicle roof component includes a roof panel having a flange structure provided at a peripheral edge portion. The flange structure defines a roof adhesive bonding zone corresponding to the body adhesive bonding zone. A forward support bracket and a rear support bracket are fixedly attached to and extend laterally across the roof panel. A portion of each forward and rear support bracket is located on the flange structure of the roof panel inwardly of the roof adhesive bonding zone. The forward and rear support brackets are configured to provide a continuous vertical spacing between the flange structure and the vehicle body. The vehicle body is formed of steel or a steel alloy, and the vehicle roof structure and the forward and rear support brackets are formed of aluminum or an aluminum-based alloy. The vehicle roof component is bonded to the vehicle body via an adhesive that is curable at room temperature applied to the roof adhesive bonding zone and the body adhesive bonding zone.

According to another aspect, a vehicle assembly comprises a vehicle body including a vehicle body component defined by a pair of laterally spaced body members for defining sides of a passenger compartment. A front roof rail and a rear roof rail span laterally between the body members. The vehicle body component together with the front and rear roof rails support a vehicle roof component over the passenger compartment. The vehicle body component defines a body adhesive bonding zone. The vehicle roof component includes a roof panel having a flange structure provided at a peripheral edge portion. A horizontal wall of the flange structure defines a roof adhesive bonding zone corresponding to the body adhesive bonding zone. A forward support bracket and a rear support bracket are fixedly attached to and extend laterally across the roof panel. A portion of each forward and rear support bracket is located on the flange structure of the roof panel inwardly of the roof adhesive bonding zone. The forward and rear support brackets are configured to provide a continuous vertical spacing between the flange structure and the vehicle body. A plurality of bolts fasten the roof component to the vehicle body component. At least one bolt connects the forward support bracket to the front roof rail and at least one bolt connects the rear support bracket to the rear roof rail. The fastened connection between of the roof component and the vehicle body is inwardly of the roof and body adhesive bonding zones. The vehicle body is formed of steel or a steel alloy, and the vehicle roof structure and the forward and rear support brackets are formed of aluminum or an aluminum-based alloy.

DETAILED DESCRIPTION

It should, of course, be understood that the description and drawings herein are merely illustrative and that various modifications and changes can be made in the structures disclosed without departing from the present disclosure. As used herein, lateral directions are transverse across the vehicle body, i.e., left and right directions. Likewise, longitudinal directions refer to forward and rearward directions of the vehicle body, and the vertical directions relate to elevation, i.e., upward and downward directions.

Figure 1:
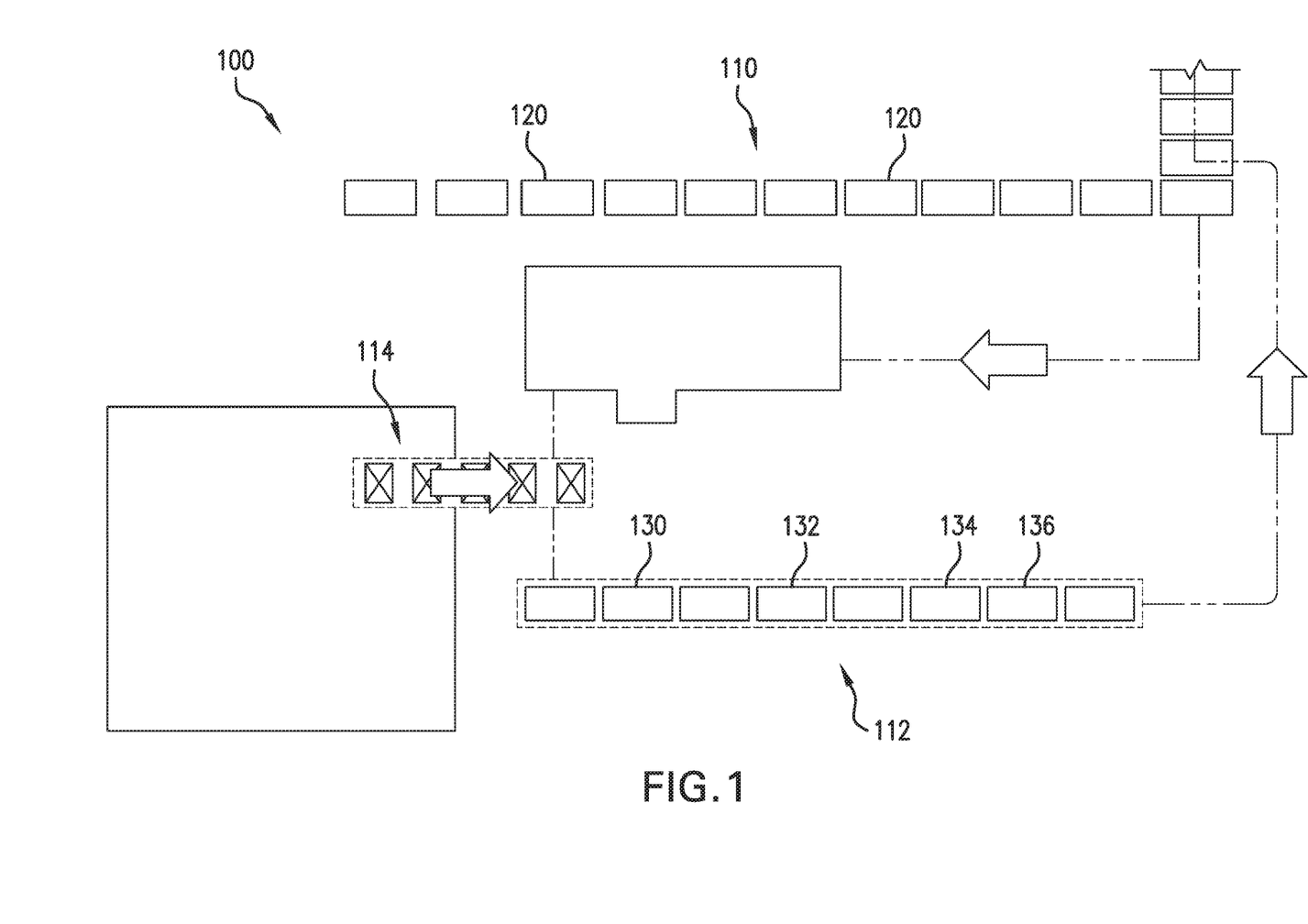
FIG. 1 is a schematic view of a system for assembling a vehicle body, including a first assembly line, a second assembly line separate from the first assembly line, and a third assembly line separate from the first and second assembly lines.
Figure 2:
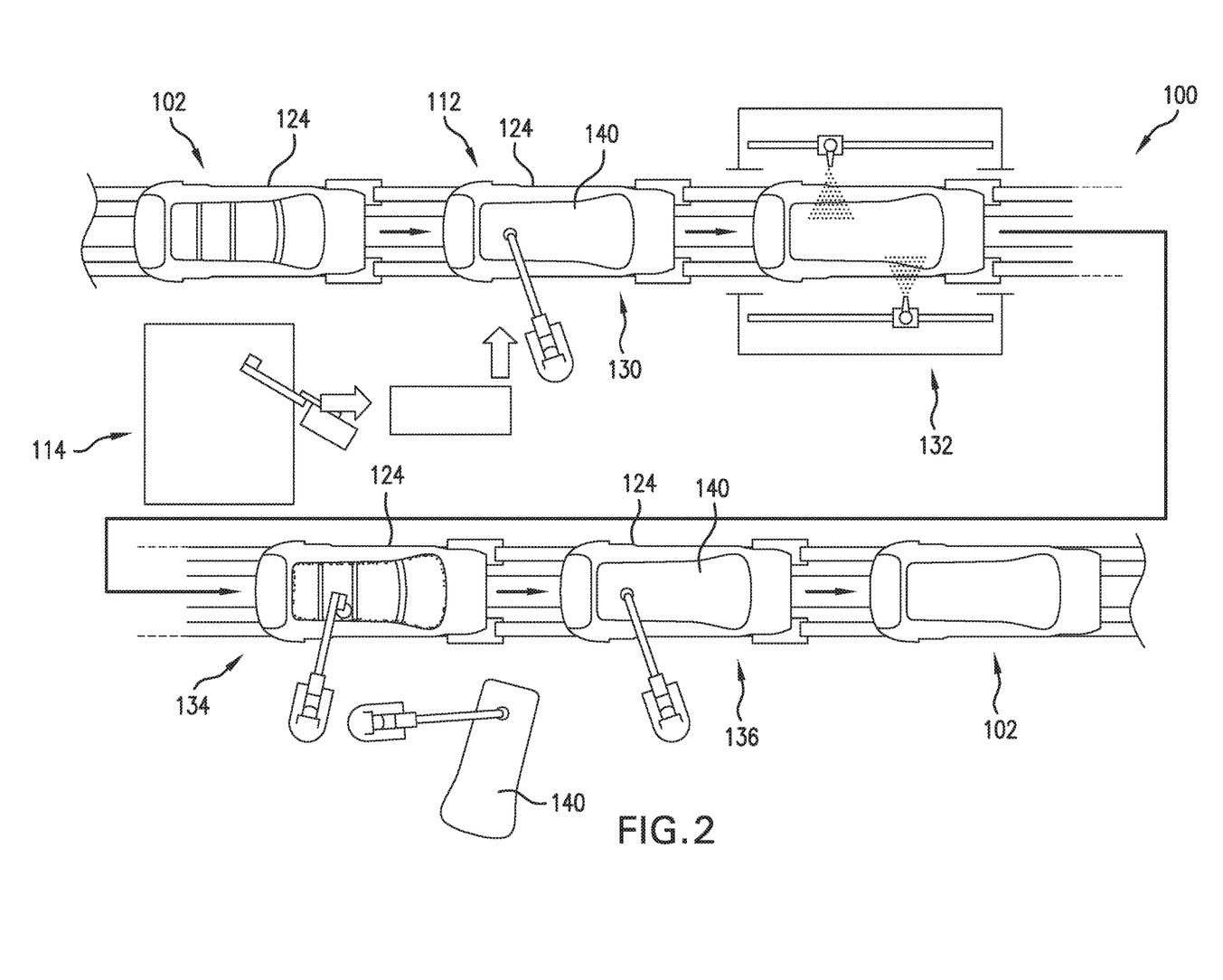
FIG. 2 is a schematic view of the second assembly line, a leftmost body station for receiving an assembled vehicle body component of the vehicle body from the first assembly line.

Referring now to the drawings, wherein like numerals refer to like parts throughout the several views, FIGS. 1 and 2 schematically illustrate a system 100 for assembling a vehicle body 102, according to the present disclosure. The system 100 can generally include a first assembly line 110, a second assembly line 112 separate from the first assembly line 110, and a third assembly line 114 separate from each of the first and second assembly lines 110, 112. The first assembly line has a plurality of first stations 120, including welding stations for welding first structural components that together define a vehicle body component 124 of the vehicle body 102. The vehicle body component 124 is formed of a first material such as a steel or steel-based alloy. The second assembly line 112 receives the vehicle body component 124 from the first assembly line. The second assembly line has a plurality of second stations 130, 132, 134, 136, and is adapted to secure a second structural component (i.e. a roof component 140) to the vehicle body component 124. The second structural component 140 is formed of a second material, which can be an aluminum or aluminum-based alloy. The third assembly line 114 is configured to assemble and transfer the roof component 140 to the second assembly line 112 for attaching the roof component 140 to the vehicle body component 124.

In contrast to the above described known method of applying a structural adhesive after the electrocoating (e-coat) and painting processes, in the second assembly line 112, the vehicle body component 124 is provided with a limited number of fasteners (e.g., 4-5 bolts) that sufficiently constrain the roof component 140 to hold it in place during the e-coat and painting processes (depicted at station 132 which for ease of discussion can be part of the second assembly line 112), but loosely enough to allow the aluminum roof component 140 to expand and contract to avoid damage as the vehicle body 102 is subjected to elevated temperatures such as those required to cure or bake the paint applied to the vehicle body. However, the fasteners are not separate parts that are removed after the e-coat and painting processes but are part of the finished assembly. Therefore, when the roof component 140 is temporarily secured to the vehicle body component 124 with the fasteners at station 130, it is secured in the same installation position that the roof component 140 will be in on the finished vehicle body. This provides certain benefits over the known method. For example, it eliminates the step of removing required spacers or other fixtures. It also maintains the spacing between the roof component 140 and vehicle body component 124 to allow all of the parts to be e-coated, but close enough to prevent paint spray from contaminating bonding surfaces of the to-be-applied adhesive.

As shown in FIG. 2, the roof component 140 is removably fastened to the vehicle body component 124 at station 130 so that a periphery flange structure 150 (FIG. 4) of the roof component 140 is spaced from the vehicle body component 124. FIGS. 11A-11E depict fastening locations at station 130. The assembly is then transferred to the station 132 for the e-coat and painting processes. After the paint is cured or baked, the assembly is then transferred to station 134 where the painted roof component 140 is removed from the painted vehicle body component 124 and an electrically nonconductive adhesive 156 (e.g., a high modulus urethane adhesive curable at room temperature) is applied to at least one of a roof adhesive bonding zone 160 and body adhesive bonding zone 162 (FIGS. 5-10). Because the adhesive 156 is applied after the e-coat and painting processes, the adhesive is adapted to accommodate paint overspray on the adhesive bonding zones 160, 162. Then at station 136 the painted roof component 140 is securely fastened to the painted vehicle body component 124 with the adhesive 156 spanning the adhesive bonding zones.

Figure 3:
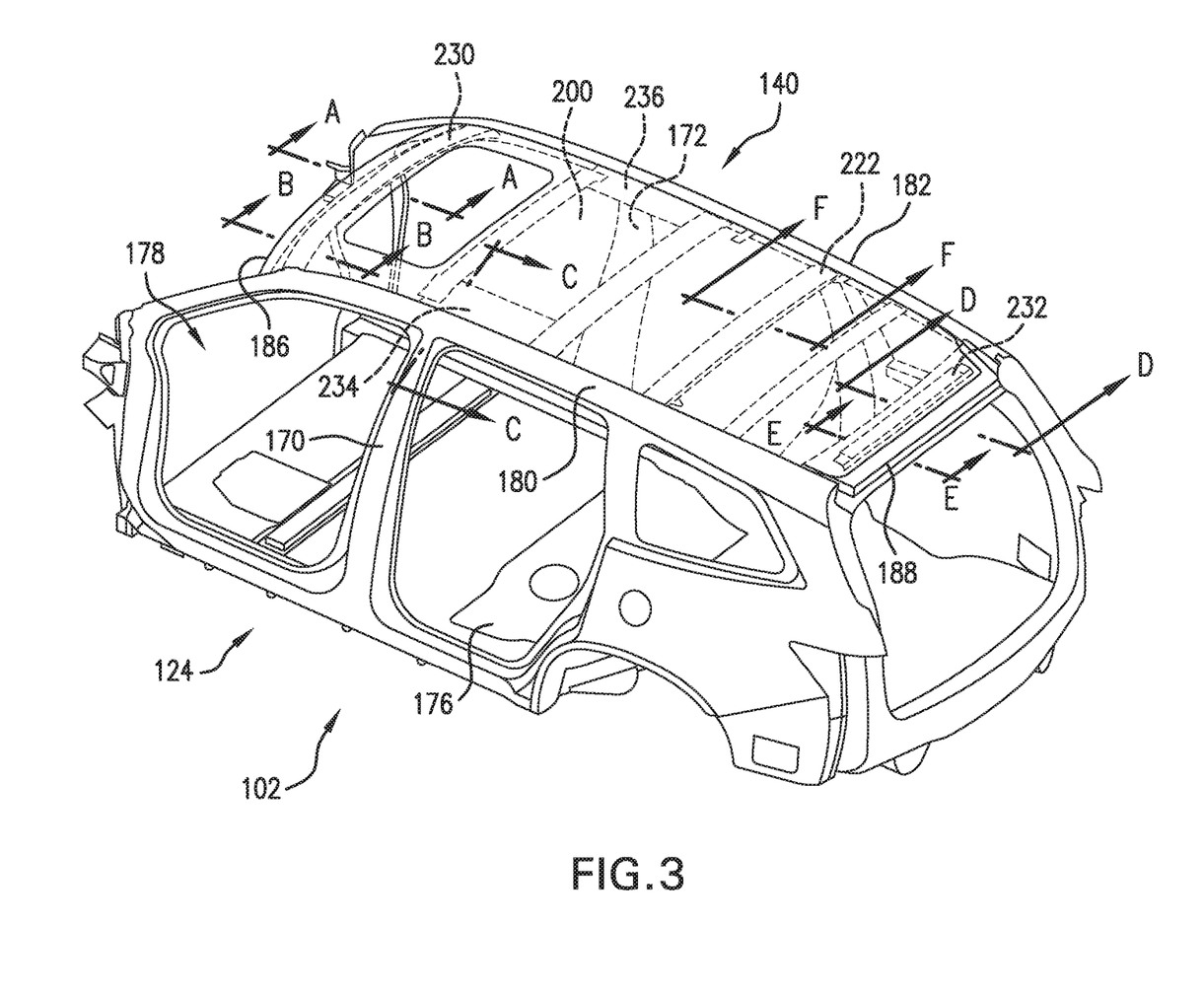
FIG. 3 is a perspective view of the vehicle body including the vehicle body component and a vehicle roof component secured thereto.

The first and second structural components of the respective vehicle body component 124 and the roof component 140 will now be described in greater detail. With reference to FIG. 3, the vehicle body component 124 can be formed of a pair of laterally spaced body members or side panels 170, 172 and a floor panel 176, which together define a passenger compartment 178. The side panels 170, 172 may be identically constructed, but for their disposition on opposite sides of the vehicle body 102, and each side panel 170, 172 can define a respective longitudinal extending side roof rail 180, 182. A front roof rail 186 and a rear roof rail 188 span laterally between the side panels 170, 172. At least one cross member or roof bow 190 (FIGS. 10 and 11D) can be interposed between the front and rear roof rails 186, 188 and extends between the side panels 170, 172. The side panels 170, 172 together with the front and rear roof rails 186, 188 support the roof component 140 over the passenger compartment 178.

Figure 4:
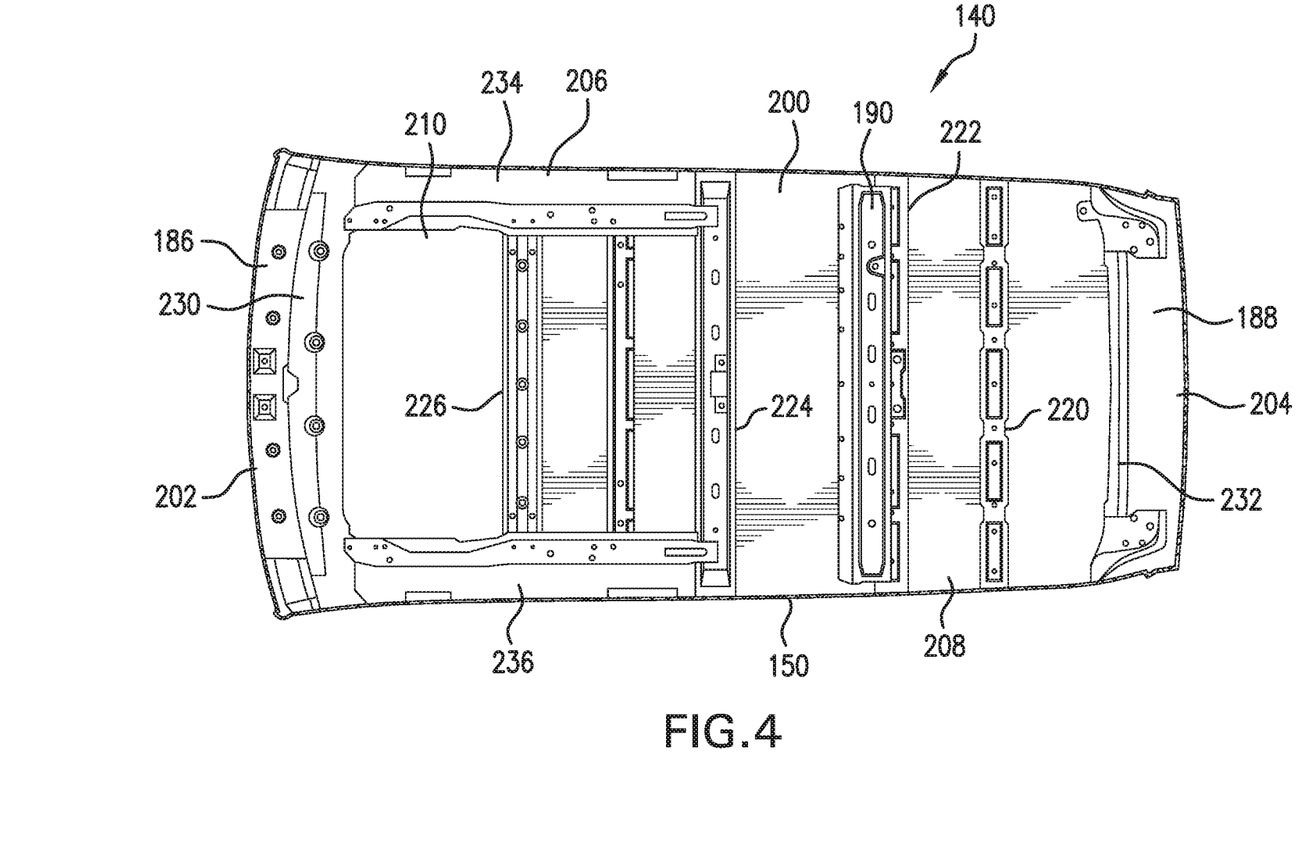
FIG. 4 is a plan view of the vehicle roof component.
Figure 5:
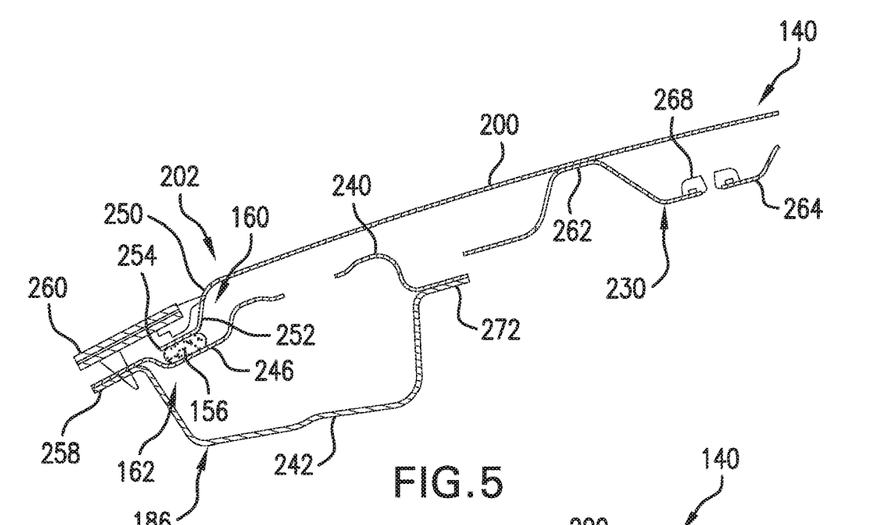
FIG. 5 is a cross sectional view taken along line A-A of FIG. 3.
Figure 6:
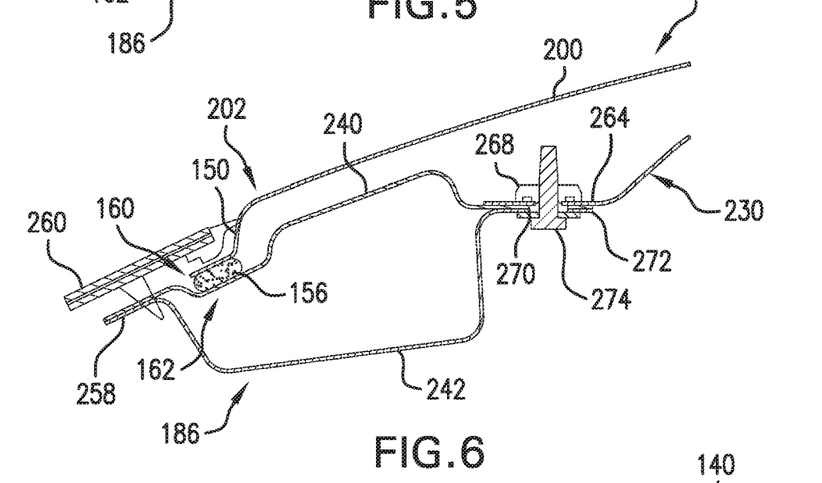
FIG. 6 is a cross sectional view taken along line B-B of FIG. 3.
Figure 11A:
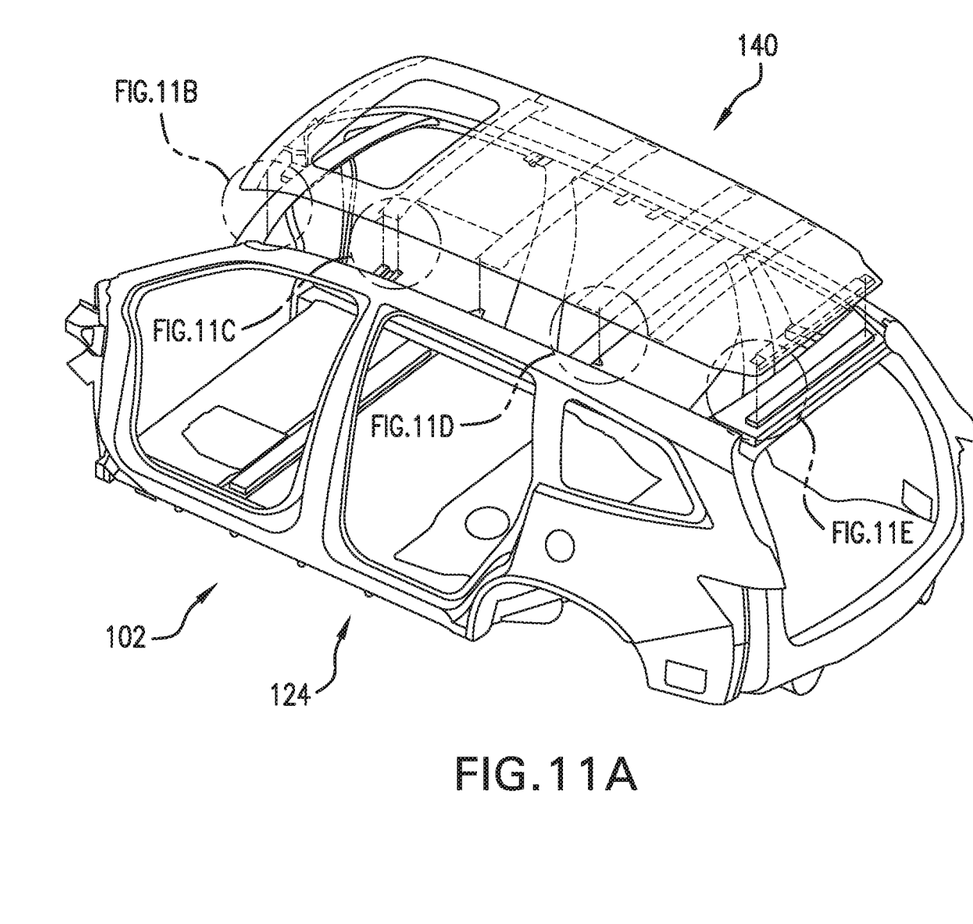
FIGS. 11A-11E are detailed perspective views of mounting locations on the vehicle body.
Figure 11B:
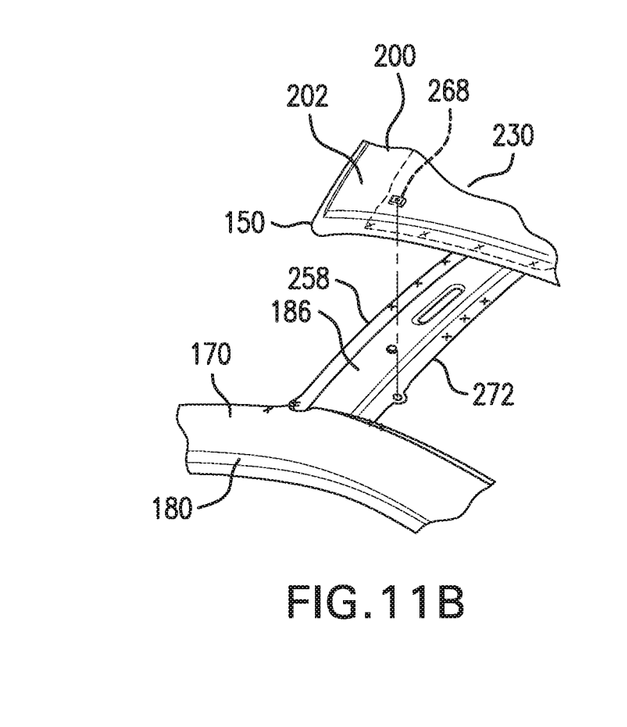
Figure 11C:
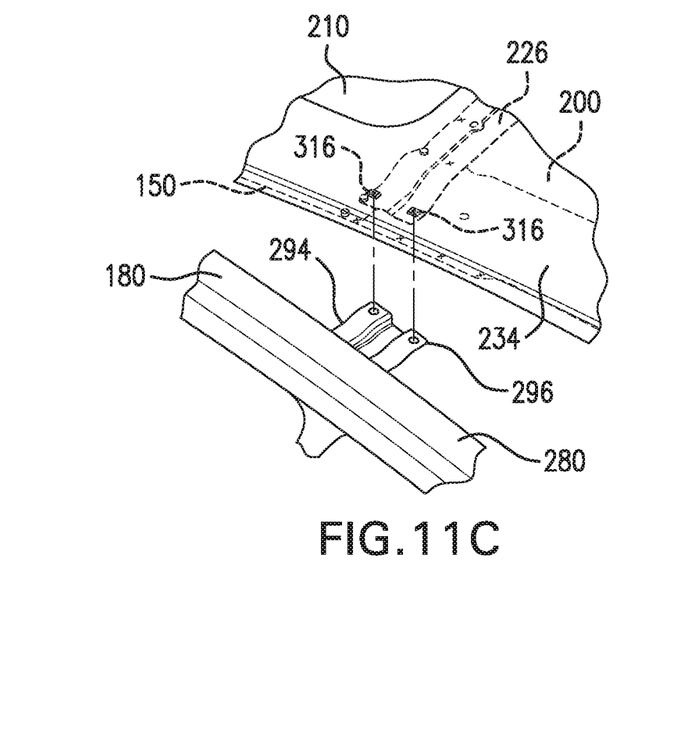

With reference to FIG. 4, the roof component 140 includes an aluminum or aluminum-based alloy roof panel 200 which overlies the passenger compartment 178. The roof panel 200 is generally rectangular in plan view but because individual vehicle roof components are required to conform to vehicle styling, the roof panel 200 can have alternative shapes. The roof panel 200 includes a forward end portion 202, a rearward end portion 204 and opposite side portions 206, 208 which extend longitudinally between the forward and rearward end portions. As is well known, an opening 210 can be provided in the roof panel 200 for a sunroof assembly (not shown). The roof component 140 further includes at least one roof stiffener. In the illustrated aspect, the at least one roof stiffener can include roof stiffeners 220, 222, 224, 226 which extend laterally across the roof panel 200 between the side portions 206, 208. In the assembled condition of the vehicle body 102, the roof stiffener 222 overlies the roof bow 190. Front and rear support brackets 230, 232 and side brackets 234, 236 are secured to the roof panel 200. The front and rear support brackets 230, 232 also extend laterally across the roof panel 200 between the side portions 206, 208. The side brackets 234, 236 extend longitudinally on the roof panel 200 between the front support bracket 230 and the roof stiffener 224. The support brackets are depicted as one-piece parts; although, it should be appreciated that alternative configurations are contemplated. For example, the side brackets 234, 236 can be two-piece parts with forward parts of the side brackets integrally formed with the front support bracket 230 and the roof stiffener 226 rearward of the opening 210 (FIG. 11C). This arrangement of the support brackets defines a one-piece rectangular-shaped support bracket which frames the opening 210, and end portions of the roof stiffener 226 can overlie the side brackets 234, 236. Each support bracket is separate from the roof panel 200 and is fixedly secured thereto to facilitate attachment of the roof component 140 and vehicle body component 124. The roof stiffeners and the support brackets of the roof component 140 are formed of an aluminum or aluminum-based alloy.

FIGS. 5, 6, 11A and 11B depict the front roof rail 186 connected to the forward end portion 202 of the roof panel 200 via the front support bracket 230. The front roof rail 186 includes an outer panel 240 and an inner panel 242 that is fixedly attached (e.g., welded) to the outer panel. As is well known, a reinforcement (not shown) can be interposed between the outer and inner panels. The outer panel 240 defines a forward section 246 of the body adhesive bonding zone 162 which, as indicated above, underlies the roof adhesive bonding zone 160. As shown, the section 246 can be recessed inwardly toward the inner panel 242 which provides a predetermined spacing from the peripheral flange structure 150 of the roof component 140. The forward end portion 202 of the roof panel 200 includes a forward section 250 of the flange structure 150 having a vertical wall 252 and a lower horizontal wall 254 (lower relative to an upper surface of the roof panel 200). The horizontal wall extends beneath an end portion of a windshield 260 adhered or bonded to an outer flange structure 258 of the front roof rail 186. The front support bracket 230 is configured to vertically space the forward section 250 of the flange structure 150 of the roof component 140 from the vehicle body component 124, and provide a continuous vertical spacing between the flange structure 150 of the roof component 140 and the vehicle body component 124 of approximately 4 mm to approximately 6 mm. In the depicted embodiment, the front support bracket 230 includes a raised portion 262 in abutting relation with a lower surface of the roof panel 200 and a support/mounting portion 264 to be fastened to the front roof rail 186. Locking members, such as weld nuts or swage nuts 268, are secured to the support portion 264. As show in FIGS. 6 and 11B, the weld nut 268 is aligned with an opening 270 provided in an inner flange structure 272 of the front roof rail 186. A fastener 274 (e.g., a bolt) inserted through the opening 270 threadingly engages the weld nut 268. The horizontal wall 254 of forward section 250 of the flange structure 150 is aligned with the section 246 of the outer panel 240 and is adhered or bonded to the horizontal wall 254 via the adhesive 156 during the vehicle body assembly described above. This positions the connection between the front support bracket 230 and the front roof rail 186 inwardly of the adhesive 156.

Figure 7:
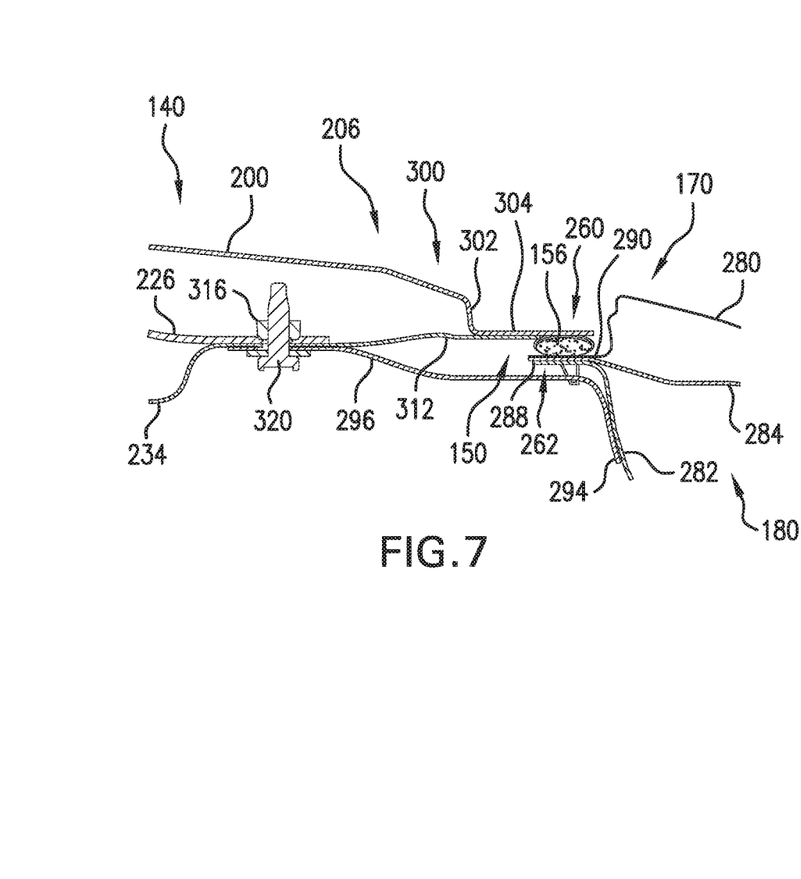
FIG. 7 is a cross sectional view taken along line C-C of FIG. 3.

FIGS. 7 and 11C depict the side roof rail 180 of the side panel 170 connected to the side portion 206 of the roof panel 200 via the side bracket 234. To simplify the explanation of the present disclosure, only the construction of the side panel 170 and its connection to the roof component 140 will be discussed, but it should be understood that the side panel 172 can have the same construction with a similar connection to the roof component 140. The side roof rail 180 includes an outer panel 280 and an inner panel 282 that is fixedly attached (e.g., welded) to the outer panel. A reinforcement 284 can be interposed between the outer and inner panels. The side roof rail 180 includes a flange structure 288. In the depicted aspect, the flange structure 288 defines a side section 290 of the body adhesive bonding zone 162 which, as indicated above, underlies the roof adhesive bonding zone 160. A connector 294 fixedly attached (e.g., welded) to the inner panel 282 includes a raised end section 296 for attachment to the roof component 140. The side portion 206 of the roof panel 200 includes a side section 300 of the peripheral flange structure 150 having a vertical wall 302 and a lower horizontal wall 304 (lower relative to the upper surface of the roof panel 200). The horizontal wall 304 overlies the flange structure 288 of the side roof rail 180.

The side support bracket 234 is configured to vertically space the side section 300 of the flange structure 150 of the roof component 140 from the vehicle body component 124, and provide a continuous vertical spacing between the flange structure 150 of the roof component 140 and the vehicle body component 124 of approximately 4 mm to approximately 6 mm. In the depicted embodiment, the side bracket 234 includes a mounting section 310 and an extension section 312 which is vertically offset relative to the mounting section. An end portion of the roof stiffener 226 overlies the mounting section 310 and includes locking members, such as weld nuts or swage nuts 316, secured thereto. The end section 296 of the connector 294 is fastened to the mounting section 310 and the roof stiffener 226 via fasteners 320 (e.g., bolts) inserted through openings in the end section 296 and mounting section 310 and threadingly engaging the weld nuts 316. The extension section 312 extends at least partially beneath the horizontal wall 304 of the flange structure 150 and an end thereof is spaced inwardly from an end of the horizontal wall 304. The horizontal wall 304 of side section 300 of the flange structure 150 is aligned with the flange structure 288 of the side panel 170 and is adhered or bonded to the horizontal wall 304 via the adhesive 156 during the vehicle body assembly described above. This positions the connection between the side bracket 234 and the connector 294 inwardly of the adhesive 156.

Figure 8:
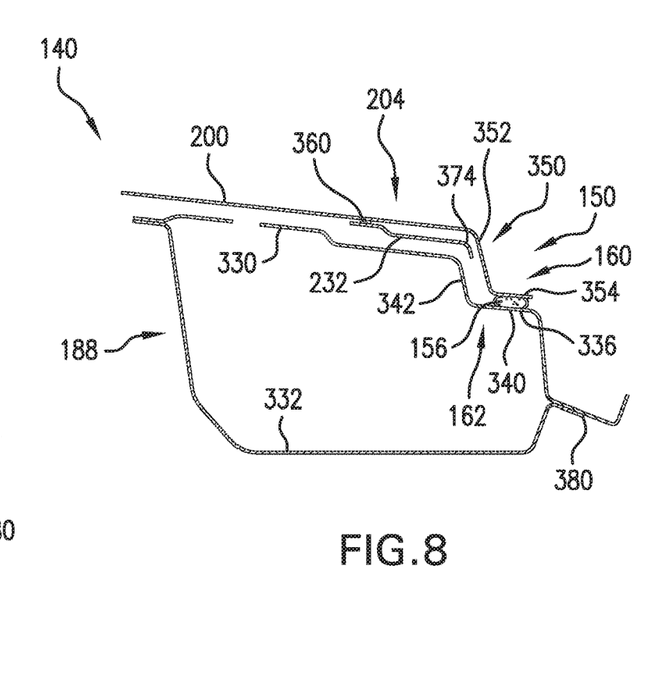
FIG. 8 is a cross sectional view taken along line D-D of FIG. 3.
Figure 9:
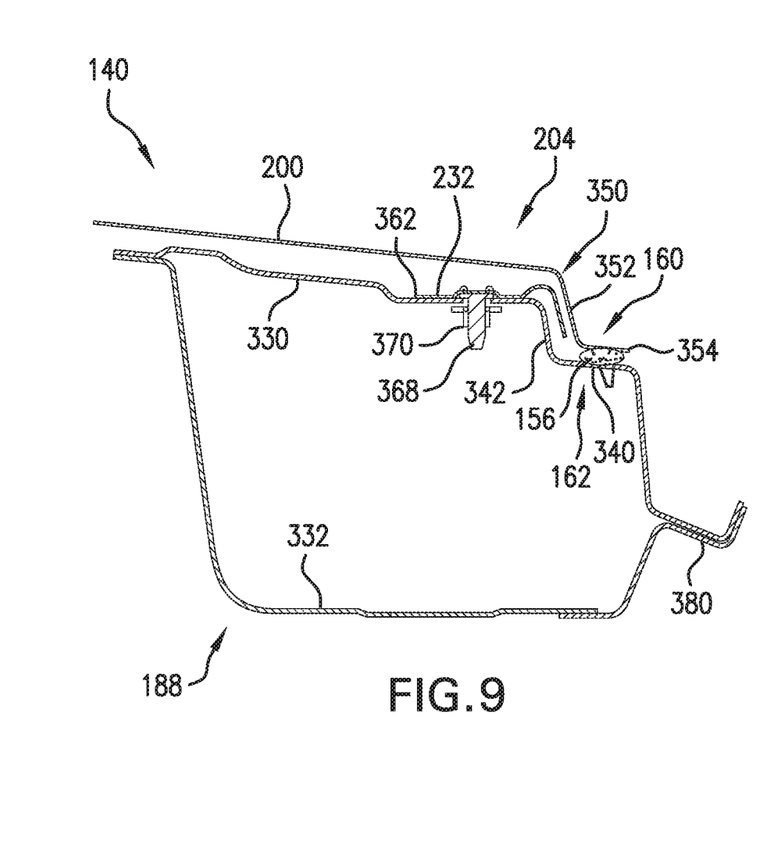
FIG. 9 is a cross sectional view taken along line E-E of FIG. 3.
Figure 11D:
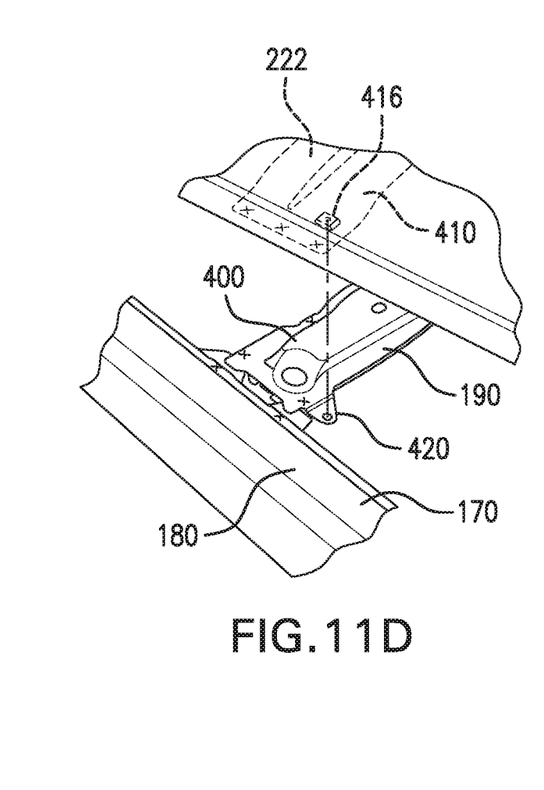
Figure 11E:
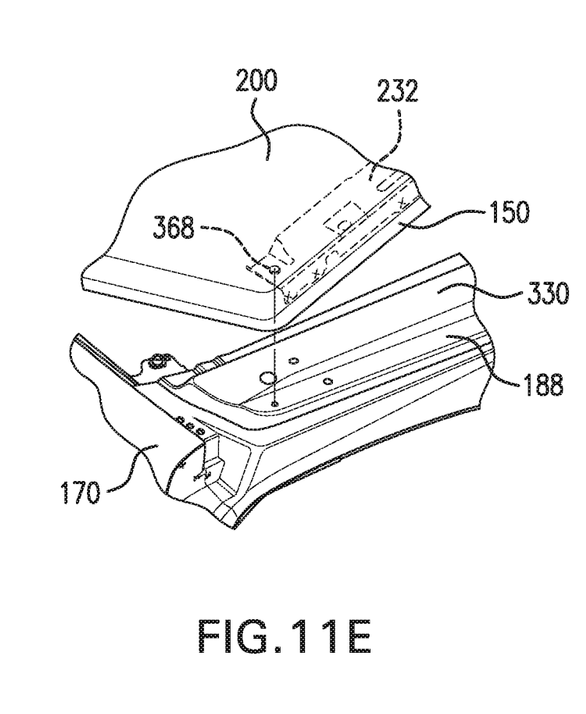

FIGS. 8, 9 and 11E depict the rear roof rail 188 connected to the rearward end portion 204 of the roof panel 200 via the rear support bracket 232. The rear roof rail 188 includes an outer panel 330 and an inner panel 332 that is fixedly attached (e.g., welded) to the outer panel. Again, a reinforcement (not shown) can be interposed between the outer and inner panels. The outer panel 330 defines a rearward section 336 of the body adhesive bonding zone 162 which, as indicated above, underlies the roof adhesive bonding zone 160. As shown, the section 336 is provided on a landing 340 of a step portion 342 on the outer panel 330. The rearward end portion 204 of the roof panel 200 includes a rearward section 350 of the peripheral flange structure 150 having a vertical wall 352 and a lower horizontal wall 354 (lower relative to the upper surface of the roof panel 200). The rear support bracket 232 is configured to vertically space the rearward section 350 of the flange structure 150 of the roof component 140 from the vehicle body component 124, and provide a continuous vertical spacing between the flange structure 150 of the roof component 140 and the vehicle body component 124 of approximately 4 mm to approximately 6 mm. In the depicted embodiment, the rear support bracket 232 includes a raised portion 360 in abutting relation with the lower surface of the roof panel 200 and a support/mounting portion 362 to be fastened to the rear roof rail 188. A locking member, such as a self-clinching threaded stud 368, is secured to the support portion 264 and is aligned with an opening provided in the outer panel 330 of the rear roof rail 188. A nut 370 threadingly engages the stud 368. The horizontal wall 354 of rearward section 350 of the flange structure 150 is aligned with the landing 340 of the outer panel 330 and is adhered or bonded to the horizontal wall 354 via the adhesive 156 during the vehicle body assembly described above. This positions the connection between the rear support bracket 232 and the rear roof rail 188 inwardly of the adhesive 156.

Figure 12:
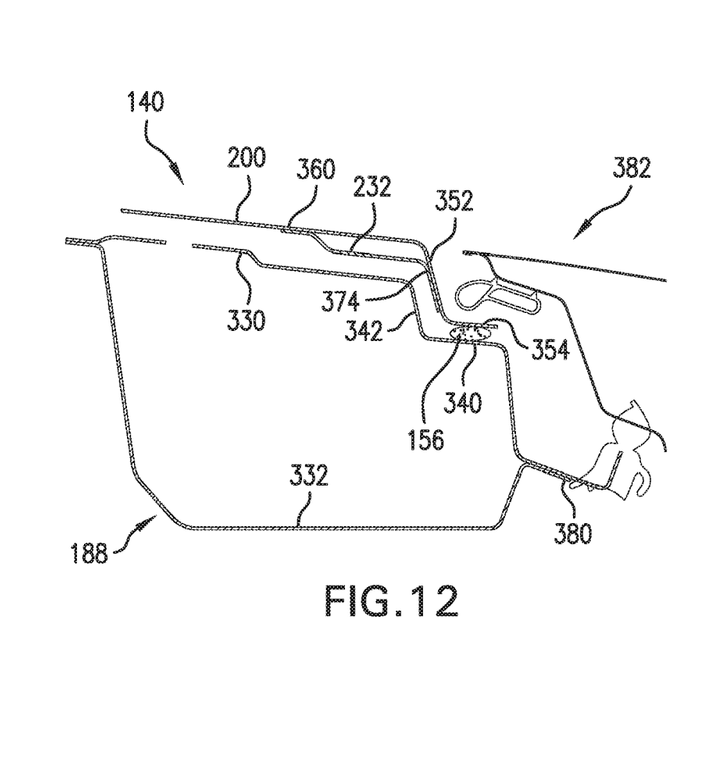
FIGS. 12-14 depicted alternative aspects of a rear support bracket for the vehicle roof component.
Figure 13:
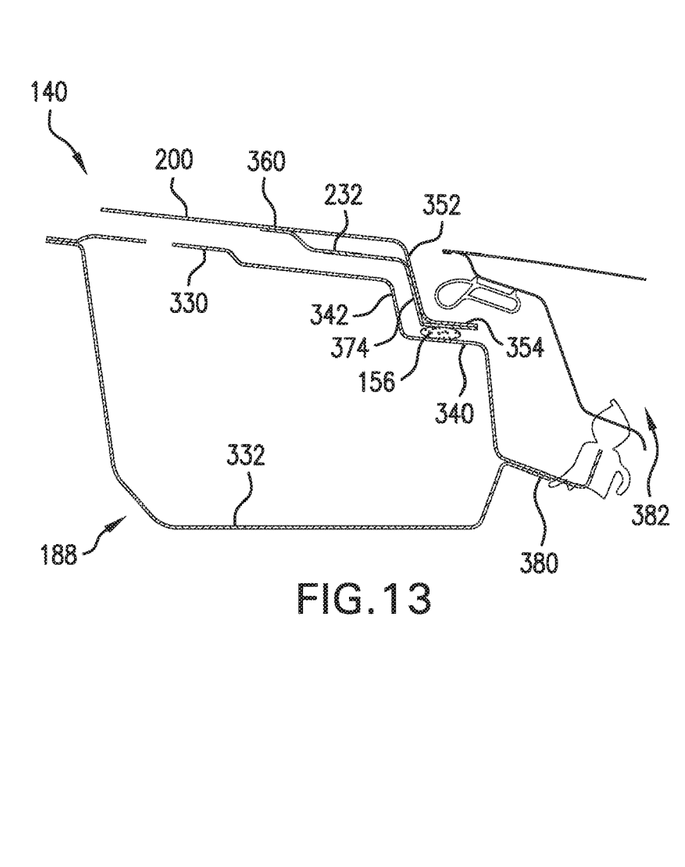
Figure 14:
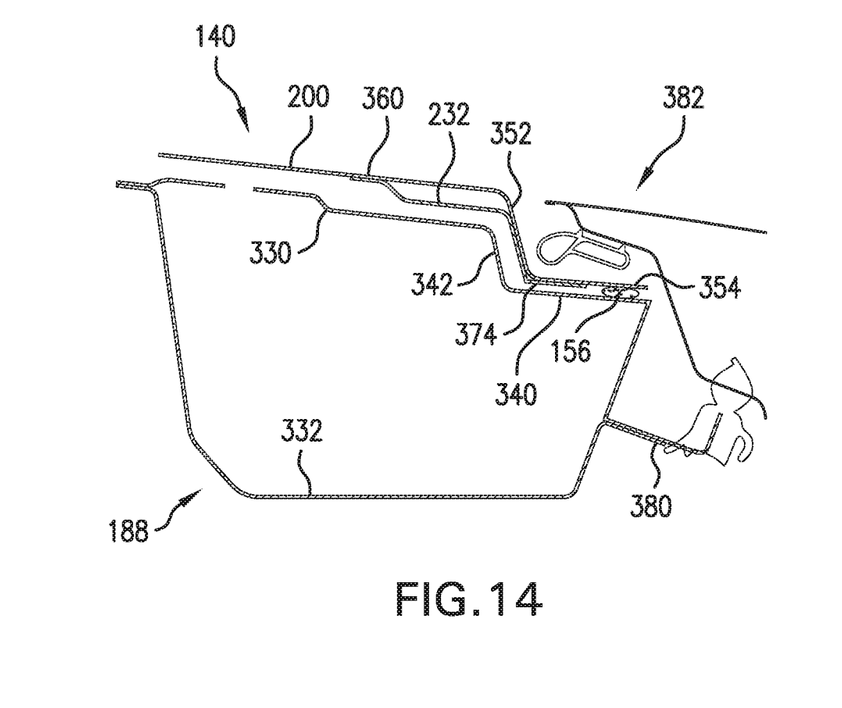

According to an aspect of the rear support bracket 232 depicted in FIG. 8, a rearward end portion 374 is curved downwardly and spaced from the vertical wall 352 of the rearward section 350. According to an aspect of the rear support bracket 232 depicted in FIG. 12, the rearward end portion 374 is curved downwardly and is fixedly attached (e.g., welded) to the vertical wall 352. According to an aspect of the rear support bracket 232 depicted in FIG. 13, the rearward end portion 374 is shaped to conform to rearward section 350 and is fixedly attached (e.g., welded) thereto. The rearward end portion 374 underlies and abuts the horizontal wall 354 and is bonded or adhered to the outer panel 330 via the adhesive 156. Therefore, according to this embodiment, the rearward end portion 374 at least partially defines the roof adhesive bonding zone 160. According to an aspect of the rear support bracket 232 depicted in FIG. 14, the rearward end portion 374 is shaped to conform to rearward section 350 and is fixedly attached (e.g., welded) thereto. The rearward end portion 374 underlies and abuts the horizontal wall 354 and is spaced inwardly from the adhesive 156. FIGS. 12-14 further depict a rear gutter 380 defined by the rear roof rail 188 and a tail gate structure 382.

Figure 10:
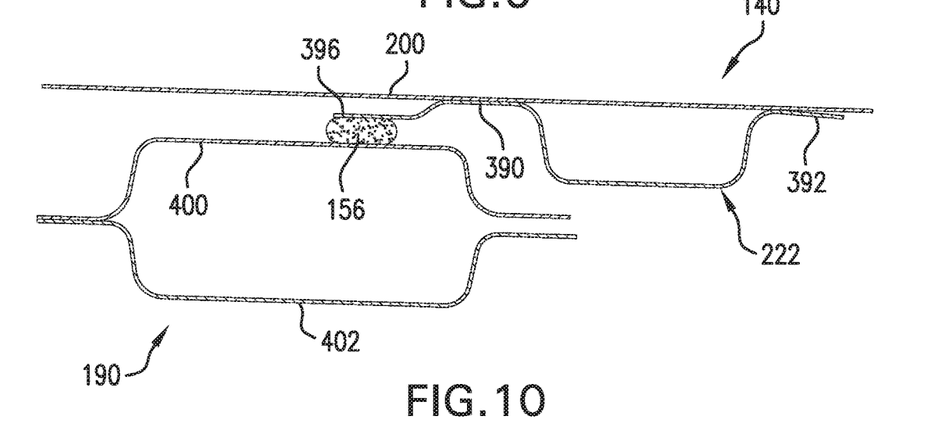
FIG. 10 is a cross sectional view taken along line F-F of FIG. 3.

FIGS. 10 and 11D depict the roof stiffener 222 adhered or bonded to the roof bow 190 via the adhesive 156. The roof stiffener 222 can be generally U-shaped with mounting flanges 390, 392 fixedly attached (e.g., welded) to the lower surface of the roof panel 200. An end portion 396 of the flange 390 is offset from the lower surface of the roof panel 200. The roof bow 190 includes an outer panel 400 and an inner panel 402 that is fixedly attached (e.g., welded) to the outer panel. With the shape of the end portion 396, a continuous vertical spacing between the end portion 396 of the roof stiffener 222 and the outer panel 400 of the roof bow 190 is approximately 4 mm to approximately 6 mm, which allows for the application of the adhesive 156 between the end portion 396 and the outer panel 400. An end portion 410 of the roof stiffener 222 includes a locking member, such as a weld nut or swage nut 416, secured thereto. The end portion 410 is fastened to the roof bow 190 via a fastener (e.g., a bolt) inserted through an opening in a mounting tab 420 located on the outer panel 400 and threadingly engaging the weld nut 416.

Accordingly, the present disclosure provided a method of securing a roof component 140 formed of aluminum or aluminum-based alloy to a vehicle body component 124 formed of a steel or steel-based alloy. The exemplary method generally comprises providing the roof component 140 including a peripheral flange structure 150 that defines a roof adhesive bonding zone 160; providing the vehicle body component 124 including an opening, the vehicle body component 124 includes a body adhesive bonding zone 162 which surrounds the opening; removably fastening the roof component 140 to the vehicle body component 124 with the peripheral flange structure 150 spaced from the vehicle body component; electrocoating the roof component 140 secured to the vehicle body component 124 including the roof adhesive bonding zone 160 and the body adhesive bonding zone 162; painting the roof component 140 secured to the vehicle body component 124; removing the painted roof component 140 from the painted vehicle body component 124; applying an adhesive 156 that is curable at room temperature to at least one of the roof adhesive bonding zone 160 and the body adhesive bonding zone 162; securely fastening the painted roof component 140 to the painted vehicle body component 124 with the adhesive 156 spanning the adhesive bonding zones 160, 162; and curing the adhesive 156.

The exemplary method further includes providing at least one support bracket 230, 232, 234, 236 formed on an aluminum or aluminum-based alloy on the roof component 140, the at least one bracket fixedly attached (e.g., welded) to the roof component 140 and fastened to the vehicle body component 124. As described above, the at least one bracket is configured to vertically space the flange structure 150 of the roof component 140 from the vehicle body component 124, and according to one aspect, the at least one bracket provides a continuous vertical spacing between the flange structure 150 of the roof component 140 and the vehicle body component 124 of approximately 4 mm to approximately 6 mm.

The exemplary method further includes positioning the fastened connection of the roof component and the vehicle body component inwardly of the adhesive 156. As depicted in the figures, the adhesive 156 provided in the spacing is outwardly of the fastened connection of the roof component 140 and the vehicle body component 124 and seals the fastened connection from moisture to prevent galvanic corrosion between the dissimilar materials of the roof component 140 and the vehicle body component 124. Further, the roof component 140 is releasably fastened to the vehicle body component 124 for electrocoating and painting in an installation position, and the roof component 140 is securely fastened to the vehicle body component 124 after application of the adhesive 156 in the same installation position. According to the present method, the roof component 140 and vehicle body component 124 are painted without masking the electrocoated roof adhesive bonding zone 160 and the electocoated body adhesive bonding zone 162. Because there is no masking, the adhesive 156 is a high modulus urethane adhesive that can adhere to paint oversprayed on the adhesive bonding zones 160, 162.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle assembly comprising:
   a vehicle body including a vehicle body component defined by a pair of laterally spaced body members for defining sides of a passenger compartment, a front roof rail and a rear roof rail span laterally between the body members, the vehicle body component together with the front and rear roof rails support a vehicle roof component over the passenger compartment, the vehicle body component defines a body adhesive bonding zone, the vehicle body is formed of steel or a steel alloy;
   the vehicle roof component including a roof panel having a flange structure provided at a peripheral edge portion, the flange structure defines a roof adhesive bonding zone corresponding to the body adhesive bonding zone, the vehicle roof structure is formed of aluminum or an aluminum-based alloy; and
   a forward support bracket and a rear support bracket are fixedly attached to and extend laterally across the roof panel, a portion of each forward and rear support bracket is located on the flange structure of the roof panel inwardly of the roof adhesive bonding zone, the forward and rear support brackets configured to provide a continuous vertical spacing between the flange structure and the vehicle body, the forward and rear support brackets are formed of an aluminum or aluminum-based alloy,
   wherein the vehicle roof component is bonded to the vehicle body via an adhesive that is curable at room temperature applied to the roof adhesive bonding zone and the body adhesive bonding zone.

2. The vehicle assembly of claim 1, further including a plurality of bolts for fastening the roof component to the vehicle body component, at least one bolt connects the forward support bracket to the front roof rail and at least one bolt connects the rear support bracket to the rear roof rail, wherein the adhesive provided in the spacing is outwardly of the fastened connection of the roof component and the vehicle body component and seals the fastened connection from moisture to prevent galvanic corrosion between the dissimilar materials of the roof component and the vehicle body component.

3. The vehicle assembly of claim 2, wherein the front support bracket includes a raised portion in abutting relation with a lower surface of the roof panel and a mounting portion fastened to the front roof rail.

4. The vehicle assembly of claim 3, wherein the front roof rail includes an outer panel and an inner panel fixedly attached to the outer panel, the outer panel defines a forward section of the body adhesive bonding zone which underlies the roof adhesive bonding zone, wherein the forward section is recessed inwardly toward the inner panel to provide the spacing from the flange structure.

5. The vehicle assembly of claim 3, wherein the mounting portion is fastened to an inner flange structure of the front roof rail.

6. The vehicle assembly of claim 2, wherein the rear support bracket includes a raised portion in abutting relation with a lower surface of the roof panel and a mounting portion fastened to the rear roof rail.

7. The vehicle assembly of claim 6, wherein the rear roof rail includes an outer panel and an inner panel fixedly attached to the outer panel, the outer panel defines a rearward section of the body adhesive bonding zone which underlies the roof adhesive bonding zone, the rearward section is provided on a landing of a step portion on the outer panel.

8. The vehicle assembly of claim 2, wherein the flange structure of the roof panel is defined by a vertical wall and a horizontal wall, an edge portion of the horizontal wall defines the roof adhesive bonding zone, the portion of the front support bracket overlaps the vertical wall and is fixedly attached to the horizontal wall, the portion of the rear support bracket is fixedly attached to the vertical wall.

9. The vehicle assembly of claim 8, wherein the portion of the front support bracket is a side portion and an opposite side portion of the front bracket overlaps the vertical wall and is welded to the horizontal wall.

10. The vehicle assembly of claim 9, wherein each side portion of the front support bracket includes a mounting section and an extension section which is vertically offset relative to the mounting section, the mounting section fastened to a connector extending from each body member, extension section extending at least partially beneath and fixedly attached to the horizontal wall of the flange structure.

11. The vehicle assembly of claim 10, wherein the each body member includes an outer panel, an inner panel fixedly attached to the outer panel, and a flange structure, the flange structure defines a side section of the body adhesive bonding zone which underlies the roof adhesive bonding zone, the connector is fixedly attached to the inner panel and includes a raised end section for fastening to the mounting section of the front support bracket.

12. The vehicle assembly of claim 11, wherein the roof component includes a roof stiffener extending laterally between the body members, an end portion of the roof stiffener overlies the mounting section and is fastened to the end section of the connector.

13. The vehicle assembly of claim 9, wherein a forward portion of the front support bracket is spaced rearward of a forward section of the flange structure of the roof panel.

14. The vehicle assembly of claim 8, wherein the horizontal wall of the flange structure is planar and is devoid of a bend.

15. The vehicle assembly of claim 1, wherein the vehicle body includes a roof bow extending laterally between the body members, and the roof component includes a roof stiffener fixedly attached to and extend laterally across the roof panel, opposite end portions of the roof stiffener located on the flange structure of the roof panel inwardly of the roof adhesive bonding zone, the roof stiffener overlapping and fastened to the roof bow.

16. A vehicle assembly comprising:
   a vehicle body including a vehicle body component defined by a pair of laterally spaced body members for defining sides of a passenger compartment, a front roof rail and a rear roof rail span laterally between the body members, the vehicle body component together with the front and rear roof rails support a vehicle roof component over the passenger compartment, the vehicle body component defines a body adhesive bonding zone, the vehicle body is formed of steel or a steel alloy;
   the vehicle roof component including a roof panel having a flange structure provided at a peripheral edge portion, a horizontal wall of the flange structure defines a roof adhesive bonding zone corresponding to the body adhesive bonding zone, the vehicle roof structure is formed of aluminum or an aluminum-based alloy;
   a forward support bracket and a rear support bracket are fixedly attached to and extend laterally across the roof panel, a portion of each forward and rear support bracket is located on the flange structure of the roof panel inwardly of the roof adhesive bonding zone, the forward and rear support brackets configured to provide a continuous vertical spacing between the flange structure and the vehicle body, the forward and rear support brackets are formed of an aluminum or aluminum-based alloy; and a plurality of bolts for fastening the roof component to the vehicle body component, at least one bolt connects the forward support bracket to the front roof rail and at least one bolt connects the rear support bracket to the rear roof rail, wherein the fastened connection between of the roof component and the vehicle body is inwardly of the roof and body adhesive bonding zones.

17. The vehicle assembly of claim 16, wherein each of the front support bracket and the rear support bracket includes a raised portion in abutting relation with a lower surface of the roof panel and a mounting portion fastened to the respective front roof rail and rear roof rail.

18. The vehicle assembly of claim 16, wherein the flange structure of the roof panel further includes a vertical wall, a portion of the front support bracket overlaps the vertical wall and is fixedly attached to the horizontal wall, and a portion of the rear support bracket is welded to the vertical wall.

19. The vehicle assembly of claim 16, wherein the roof component includes a roof stiffener extending laterally between the body members, an end portion of the roof stiffener overlies a part of the front support bracket and is fastened to one of the body members.

20. The vehicle assembly of claim 16, wherein the roof adhesive bonding zone is bonded to the body adhesive bonding zone via an adhesive that is curable at room temperature.

* * * * *